United States Patent [19]

Thorley

[11] 4,176,999

[45] Dec. 4, 1979

[54] WHEELCHAIR LIFT

[75] Inventor: Graham R. Thorley, San Diego, Calif.

[73] Assignee: Transportation, Design & Technology, Inc., San Diego, Calif.

[21] Appl. No.: 885,714

[22] Filed: Mar. 13, 1978

Related U.S. Application Data

[63] Continuation-in-part of Ser. No. 769,636, Feb. 2, 1977, Pat. No. 4,081,091.

[51] Int. Cl.² .................................................. B60P 1/46
[52] U.S. Cl. .................................... 414/540; 280/166; 105/447
[58] Field of Search ............... 187/1, 9, 10; 214/75 R, 214/75 G, 77 R, 75 T, 75 H, 730; 296/61, 62; 280/163, 164 R, 164 A, 166; 105/443, 444, 445, 447, 448, 449, 430; 244/137 R; 52/182, 183, 184

[56] References Cited

U.S. PATENT DOCUMENTS

| | | | |
|---|---|---|---|
| 461,156 | 10/1891 | Barber | 105/431 |
| 3,572,754 | 3/1971 | Fowler | 105/447 |
| 3,574,322 | 4/1971 | Hancock et al. | 280/166 |
| 3,906,690 | 9/1975 | Miriani | 52/184 |
| 3,912,048 | 10/1975 | Manning | 214/75 R |
| 3,913,497 | 10/1975 | Maroshick | 280/166 |
| 3,918,596 | 11/1975 | Ward | 214/75 R |
| 3,957,284 | 5/1976 | Wright | 280/166 |
| 4,020,920 | 5/1977 | Abbott | 105/447 |
| 4,022,337 | 5/1977 | Eichenhofer et al. | 214/75 R |
| 4,027,807 | 6/1977 | Thorley | 280/166 |

*Primary Examiner*—Albert J. Makay
*Attorney, Agent, or Firm*—Henri J. A. Charmasson

[57] ABSTRACT

A lift device particularly suitable for lifting handicapped persons with or without wheelchairs, into a vehicle or building. The lift can be incorporated into the doorway of any given vehicle, or into any step structure within a building. The lift, in its stowed position, forms the normal steps. The platform is made of four hinged parallel sections which can be withdrawn and folded into two steps. The second section which forms the upper step riser in the stowed position comprises two telescopically interconnected elements, and can be expanded to provide a wider platform. The fourth section which forms the lower step riser in the stowed position can be rotated to act as an access ramp along the forward edge of the platform and flipped upward to form an angle stop preventing the wheelchair from rolling backward during platform motion.

8 Claims, 8 Drawing Figures

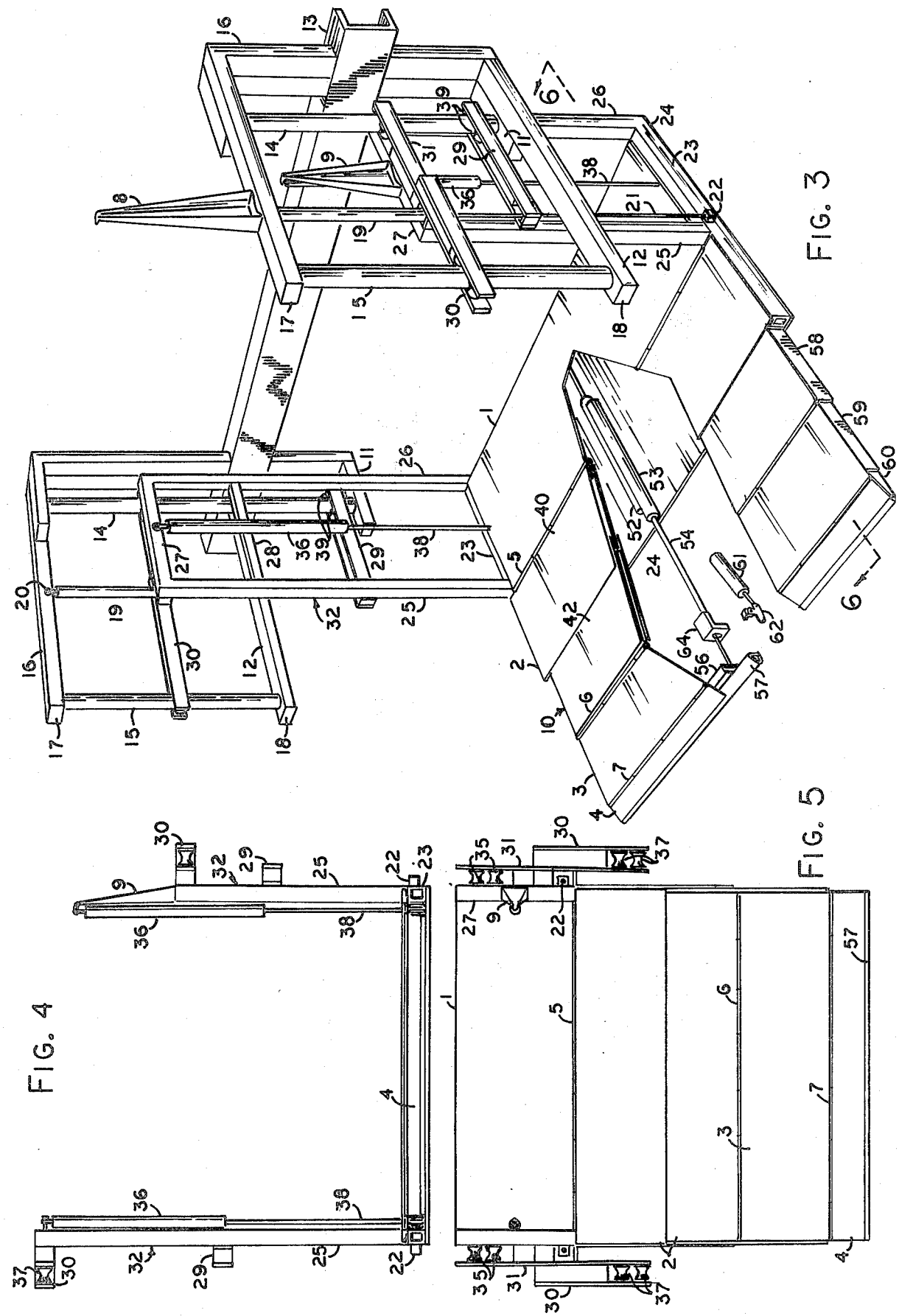

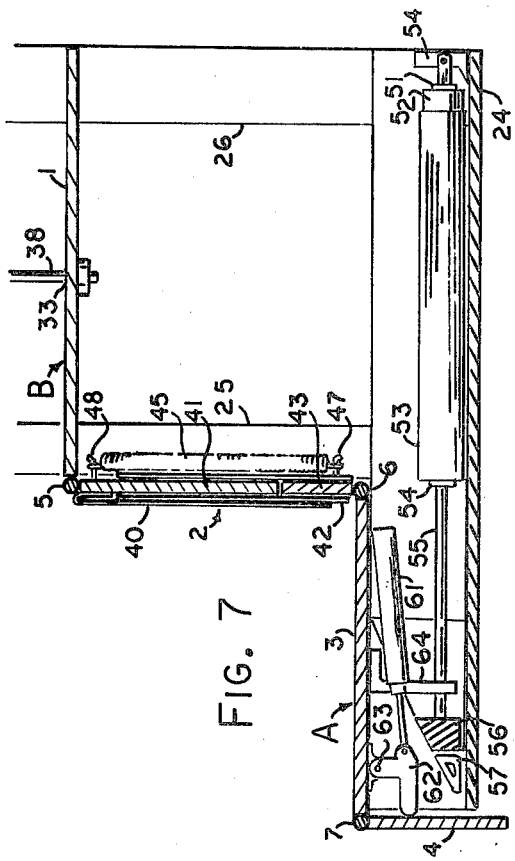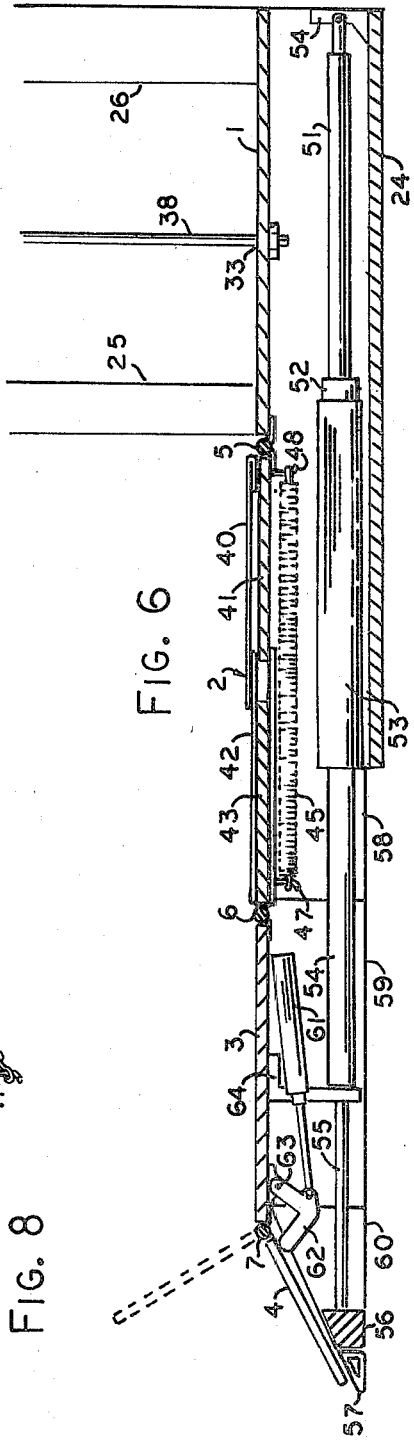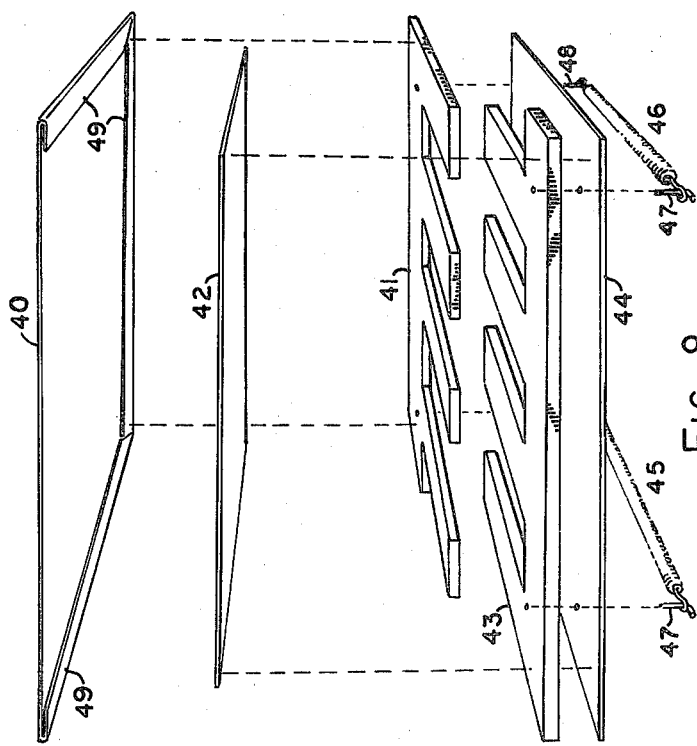

WHEELCHAIR LIFT

PRIOR APPLICATION

This application is a continuation in part of co-pending application Ser. No. , 02/02/77; now U.S. Pat. No. 4,081,091.

BACKGROUND

This invention relates to loading mechanisms, and, more particularly, to lift devices suitable for loading handicapped persons with or without wheelchairs into vehicles such as busses or other types of public conveyances. It also relates to lift devices suitable for helping such persons in negotiating steps at the entrance of, or within, a building.

Life devices which in the past were designed for vehicular use, were relatively bulky and cumbersome, taking up a great deal of space in the interior of such vehicles. It is clearly preferable to have the lift devices completely contained in the vehicles when such vehicles are in motion. However, the large size of the lift mechanisms has often necessitated external location of at least a portion of such equipment. The vehicle cargo capacity has often been greatly reduced by the portion of the lift mechanism located inside the vehicle.

Furthermore, the size and complexity of such lift mechanisms often required that a special opening be cut into the side of the vehicle, in addition to the normal entrances, in order to accommodate the lifts.

Lift mechanisms designed to help handicapped persons in negotiating steps at the entrance of, or within a building which have been provided up to the present time, have been relatively bulky and unsightly. These devices often interfere with the common use of the steps by normal people, and may require the opening of special doors or the installation of special ramps in addition to the normal entrances and stairways. The proposed lift device in its stowed position can act as the normal step structure and be completely hidden within it.

SUMMARY

The lift device can be incorporated into any doorway entrance of vehicles suitable for either public or private conveyance. The lift in its stowed position forms the normal entrance steps, and, when required, can either be operated by the driver, without his moving from the driving position, or by the handicapped person himself from the entry location. The various step elements change into a platform which can be lowered, or raised, to any position between vehicle floor height and ground level. The principal object of this invention is to provide a handicap lift which can be easily installed within the entry well of most conventional public transit vehicles. This object achieved by replacing the normal entrance steps by a structure comprising load carrying platform made of four parallel sections. The sections are hinged together so that they can be folded into two steps in the stowed position. The supporting framework and lifting mechanism are conveniently installed along each side of the step well, and do not interfere with the use and operation of the vehicle. There is no need to provide for a platform storage space underneath the vehicle floor or within the vehicle itself. One of the platform sections comprises two telescopic elements and can be expanded to provide a wider load-carrying platform. The fourth element along the forward edge of the platform can be tilted to act as an access ramp for a wheelchair. It can also be flipped upward to act as an angle stop preventing the wheelchair from rolling off the platform during lifting. The present invention may also be installed within other types of step structures, such as those found in split level homes, at the entrance of a building or as part of a loading dock.

IN THE DRAWING

FIG. 3 is a perspective view of the supporting structure and lift mechanism in the deployed position.

FIG. 4 is a front elevational view of the lift carriage.

FIG. 5 is a top view of the lift carriage, showing the deployed platform.

FIG. 6 is a side sectional view taken along the line 6—6 of FIG. 3.

FIG. 7 is a sectional view similar to FIG. 6, but showing the platform in the stowed, step-forming position.

FIG. 8 is an exploded, perspective view of the expandable section.

DESCRIPTION OF THE PREFERRED EMBODIMENT

Figure 1:
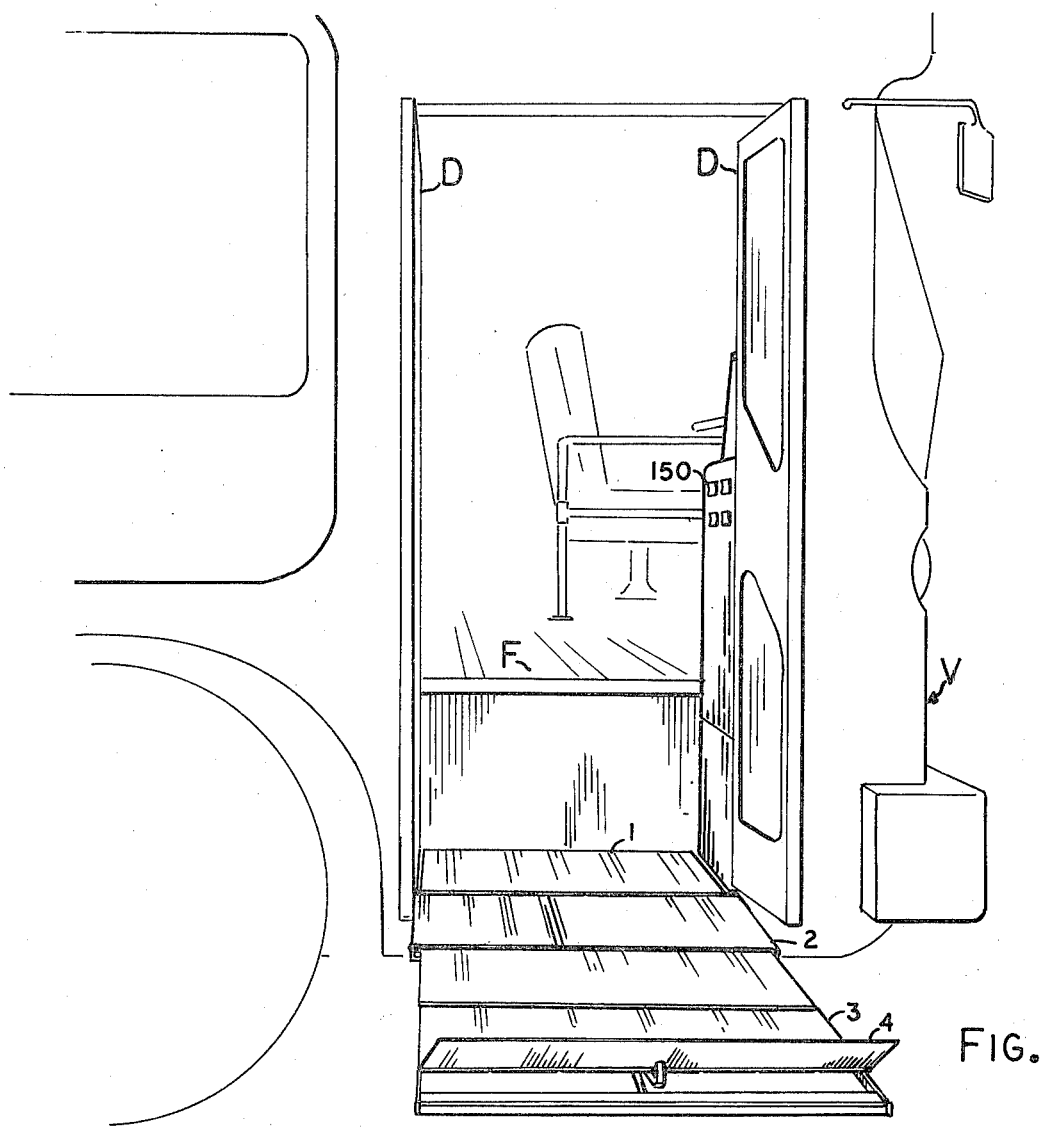
FIG. 1 is a perspective view showing the invention installed at the entrance of a public transportation vehicle in the deployed position.

Referring now to the drawing, as an example of one embodiment of this invention, there is shown a wheelchair lift device mounted within the doorway of a public transportation vehicle.

In FIG. 6 the lift is deployed in its lower position. It should be noted that the surface of the load carrying platform 10 is formed by the level section 1 of step B (which is normally the closest to the vehicle floor in the stowed position and the level Section 3 of step A, which had been extended outward, the joint riser section 2 between steps A and B (which has been laid down flat), and the riser section 4 below step A. The four sections 1, 2, 3, and 4 are articulated by being hinged together along their edges 5, 6, and 7. In order to return the lift to the stowed position the level section 3 on step A is withdrawn and the riser section 2 is raised to a vertical position so that the level surfaces 1 and 2 are placed on two different levels forming the entrance steps.

The lower riser section 4, as shown in FIG. 6 can be rotated to form a sloping access ramp to the load carrying platform 10. It can also be flipped upward as shown in broken lines in order to prevent a load such as a wheelchair from rolling backward during motion of the platform 10.

Referring now to FIG. 3, the lift device comprises two pairs of horizontal girders 11 and 12 welded to the frame 13 of the vehicle V, and located at opposite sides of the doorway. Girders 11 support two vertical cylindrical rods 14 which are capped at their upper end by the horizontal section of "L" shaped stanchions 16. Girders 12 are preferably anchored to the wall of the vehicle at ends 18. Stanchions 16 are anchored to the wall of the vehicle at their upper ends and to beam 13 of the vehicle at their lower ends. The vertical cylindrical rods 14 and 15 hereinafter referred to as "lifting guides," girders 11 and 12 and stanchions 16 form the supporting framework of the lift device and its stationary components.

The moving components of the lift device comprising the articulated platform sections 1, 2, 3, and 4 and associated means to form the lift platform, are mounted on a generally "U" shaped carriage 32 designed to ride vertically along and between the two pairs of lifting guides 14 and 15. As more specifically shown in FIGS. 4 and 5, this carriage comprises a base formed by 2 iron beams 23 linked by a rectangular skid plate 24 flanked by two lateral elements extending upward from the base.

Each lateral element is formed by vertical members 25 and 26 fastened to beam 23, and crossmembers 27 and 28.

Each lateral element is slidingly connected to lifting guides 14 at its upper end through bracket 31 at mid-section through bracket 29, and to lifting guide 15 through brace 30.

Pairs of pulley shaped rollers 35 and 39, and 37 having grooved rims matching the convexity of cylindrical guides 14 and 15 are mounted within bracket 31, 29 and brace 30 respectively capturing said guides and providing a smooth and stable movement of carriage 32 vertically along and between them.

Two hydraulic cylinders 19 are connected at their upper closed ends to the horizontal sections of stanchions 16 by pin 20. Pistons moving within these cylinders under hydraulic fluid pressure are connected at their outer ends through rod 21 to beams 23 by means of pin 22 thus providing means for lifting carriage 32 along and between the lifting guides 14 and 15.

The level section 1 of step B is seen riding between vertical members 25 and 26 which act as vertical guides during its collapsing motion.

Two hydraulic cylinders 36 are connected at their upper closed ends to cross-members 27. Pistons moving within these cylinders under hydraulic fluid pressure are connected at their outer ends through rods 25 to opposite ends of level section 1 thus providing means for vertically moving step B along and between members 25 and 26.

Since the lift is designed to be installed in the front right entrance well of a public vehicle, and in order not to obstruct the driver's field of vision, the right side supporting elements 11, 12, and 16 are mounted on a lower level than their opposite left side elements.

The carriage right lateral element is also shorter than the left lateral element. Bracket 8 and 9 are used to compensate for the difference in height and to hold hydraulic cylinders 19 and 36 respectively at levels sufficient to yield the required lifting action.

The level section 3 of step A is fastened to element 59 of slide assemblies associated with beams 23. Each slide assembly is made of three telecopic elements 58, 59 and 60.

These types of standard slide assemblies well known to persons skilled in the mechanical arts are used in a variety of commercial and industrial applications to provide a low friction slidable coupling between mechanical structures. These slides are commercially available under various trade names and generally comprise an outer member channels capturing an inner member between rows of ball bearings.

Elements 58 of the slides are slidingly connected to the inside lateral surface of beams 23. Elements 59 are slidingly connected to elements 58 and support level section 3 of the platform. Elements 60 are connected to elements 59, are tapered down toward the front of the platform, and are designed to support the raiser section 4.

The two elements 60 are cross-connected by an end beam 56. A pressure sensitive sensor 57 runs along end beam 56.

The riser section 2 of step B comprises two telescopic interconnecting flat elements 41 and 43. The upper element 41 is hingedly connected along its upper edge to level section 1 of Step B. The lower element 43 is hingedly connected along its lower edge to level element 3 of step A. Their opposing edges are crenelated in order to form interlocking patterns as shown in FIG. 8. The lower element 43 is sandwiched between the step surface plate 42 and the supporting plate 44. The upper element 41 telescopically and partially engages into the sheath thus constituted. A step surface cover 40 having overlapping edges 49 is fastened to the upper element 41. The overlapping edges are bent under the cover to provide a sliding space for the other surface plate 42.

The two elements 41 and 43 are resiliently kept to their minimum common width by a pair of coil springs 45 and 46. Attached to lower element 43 by pins 47 and to upper element 41 by pins 48.

When the platform is in the stowed position, as illustrated in FIG. 7, the riser section 2 is allowed to shrink to its minimum width under the pull of the coil springs 45 and 46.

When the platform is fully deployed, as illustrated in FIGS. 3 and 6, the riser section 2 is expanded to its maximum width in order to provide additional load carrying surface.

Two hydraulic cylinders 52 and 53 mounted back to back have their piston rods 51 and 54 extending in opposite directions. The end of rod 51 is connected to a bracket 50 in the lower back corner of the carriage 32. The end of rod 54 is extending into a smaller diameter rod 55. Rod 55 passes through a hole in the center of bracket 64 associated with level section 3 of step A, and is connected to the end beam 56.

When rods 51 and 54 are extended under fluid pressure the end beam 56 is first pushed forward, causing the riser section 4 of step A to rotate upward around hinge 7 until it forms an access ramp to the load-carrying platform 10 as illustrated in FIG. 6.

At this point rod 54 comes in contact with bracket 64, and begins to push level section 3 of step A forward.

This forward motion is coordinated with a downward motion of level section 1 of step B under the action of hydraulic cylinders 36.

As the hydraulic cylinder rods 52 and 54 continue their outward movement the expandable riser section 2 of step B is stretched to its maximum elongation between level sections 1 and 3.

When the platform 10 has been loaded with a wheelchair, the riser section 4 of step A can be flipped upward under the action of level 62 associated with hydraulic cylinder 61 in order to provide an angle stop for the wheelchair.

The pressure sensor mounted along the outer edge of end beam 56 is made of flexible material. Any pressure applied to the sensor upon contact with any object is transmitted through its fluid to a pressure switch, which is part of the electrical safety control system.

Grooved plastic or rubber mats are preferably used to cover the steps and ramp surfaces for safety purposes.

The means for operating the hydraulic cylinders, such as those used in this invention, are well known to people skilled in the mechanical arts, and comprise a source of pressurized fluid, such as a pump, and various conduits for feeding the pressurized fluid to manually of solenoid controlled valves. The valves, in turn, direct the flow of pressurized fluid into the cylinders on either sides of the pistons, so as to control the movement and direction of the pistons within the cylinders. Solenoid controlled valves also having manual lever control are preferably used in the present invention, and in combination with the cylinders and associated means, constitute the electro-hydraulic powered means to operate the lift.

Figure 2:
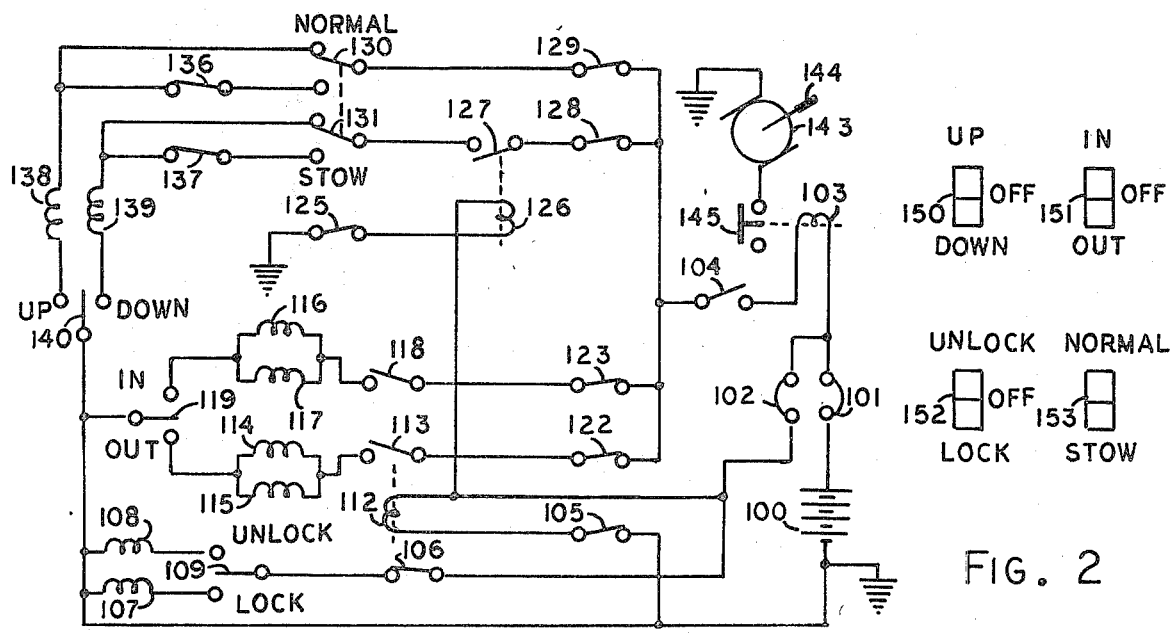
FIG. 2 is a schematic of the electrical system.

Referring now to FIG. 2, in addition to the other drawings, I shall describe the operation of the lift device.

The lifting motion of cylinders 19 (FIG. 3) is controlled by valve solenoid 138; the lowering action being controlled by valve solenoid 139.

The outward deploying motion of cylinders 53 and 54 (FIG. 6) is controlled by valve solenoid 115; the inward retracting action by valve solenoid 116.

The step lowering motion of cylinder 36 (FIG. 4) is controlled by valve solenoid 114, and the step raising motion by valve solenoid 117.

The electrical power supply comprises the vehicle battery 100 protected by circuit breakers 101 and 102.

Manual switches 150, 151, 152, and 153 are accessible from the driver's seat or from the entrance area of the vehicle, and allow the driver or the lift user to control the operations of the lift. Switches 150, 151, and 152 are preferably of a momentary type which return to the off position when released.

A three-position switch 150 controls the position of the common 140, and is used to raise or lower the carriage 32. A three position switch 151 controls the position of the common 119, and is used to deploy or retract the platform 10. A three position switch 152 controls the position of common 109, and is used to raise or lower the wheel chair angle stop 4. A two position switch 153 controls commons 130 and 131, and is used to return the lift to its stowed location.

While the switch 153 is in the NORMAL position, holding switch 150 to the DOWN position energized the valve solenoid 139 through switch 131, 127, 128, and 104. Coil 103 of the pump control solenoid switch 145 is energized and the pump 143 is started, causing the lowering of the carriage 32 by cylinders 19.

Holding switch 150 in the UP position energized the valve solenoid 138 through switches 130, 129, and 104. The pump 143 is similarly started and the platform 10 is deployed by extending step section 3 under action of cylinders 52, and 53, while step section 1 is lowered under simultaneous action of cylinders 36.

Holding the switch 151 in the IN position energized the valve solenoids 116 and 117 through switches 118, 123, and 104. The pump 143 is similarly started, and the step section 3 is retracted under action of the cylinders 52 and 53, while the step section 1 is raised under simultaneous action of the cylinders 36.

While the switch 152 is held in the LOCK position, valve solenoid 108 of hydraulic cylinder 61 is activated through switches 109, and 106. The lever 62 pivots around pin 63, thus causing section 4 to rotate upward around hinge 7.

While the switch 152 is held in the UNLOCK position, the action of hydraulic cylinder 61 is inverted by valve solenoid 107 through switches 109 and 106 causing section 4 to return toward it DOWN position.

The various mechanical motions just described are further controlled through the following switch means. In most public transit vehicles, the door opening mechanism is interlocked with the braking system in order to prevent accidental opening of the vehicle while it is in motion. Therefore, in order to block the operation of the lift device while the doors are closed or the vehicle is moving, the electric power supply is run through a pole of the vehicle door interlock switch, which close contact 104 only when the door is fully open.

A down limit switch actuated when rods 21 (FIG. 3) reach the maximum extension opens switch 128 thus stopping pump 143. An up limit switch, actuated when the platform 10 reaches the level of the vehicle floor F opens switch 129 in order to stop further lifting action of platform 10. An outward limit switch actuated when the platform 10 is fully deployed, opens switch 122 stopping the deployment operation.

An inward limit switch, actuated when the platform 10 is fully retracted opens switch 123 in order to stop further retraction of the platform 10. A mat-type contact switch, located under the skid plate 24, and actuated whenever the platform touches ground or an obstacle, closes switch 125, energizing the coil of obstruction relay 126, causing switch 127 to open. This interrupts further downward motion of the platform 10.

A stop-down limit switch actuated when the wheel chair angle stop 4 is down, closes switch 118 in order to allow retraction of section 3 only when the angle stop 7 is lowered.

A ramp-out limit switch actuated when the ramp is fully extended closes switch 106 in order to prevent raising the angle stop 4 while the section 3 is retracted.

A stowed position switch actuated when the carriage 10 reaches its normal step position opens switches 136 and 137, stopping further upward or downward motion of the carriage when switch 153 is in the STOW position.

A pressure switch located along the end beam 56 and actuated whenever the ramp hits an obstacle, closes switch 105, energizing the coil of relay 112, thus opening switch 113, and preventing any further extension of the platform 10. The standard sequence of operation is generally as follows. After opening the door D of the vehicle V, hand flipping switch 153 to the NORMAL position, the driver holds switch 150 in the DOWN position until the carriage 32 touches ground. After releasing switch 150, he holds switch 151 in the OUT position until the platform 10 is fully deployed. After the loading of the wheel chair onto the platform 10 the angle stop 4 is raised by holding switch 152 in the LOCK position for a short while.

The platform 10 is raised to the level of the vehicle floor F by holding the switch 150 in the UP position. After entry of the wheel chair into the vehicle, switch 153 is returned to the STOW position. The angle stop 4 is lowered by holding switch 152 in the UNLOCK position. The carriage 32 is lowered to the stow away level by holding switch 150 to the DOWN position and the platform 10 is retracted into the stowed step position by next holding the switch 151 on the IN position. The sequence of operation may be appropriately reversed to lower a wheel chair from the vehicle floor to the ground. The carriage 32 may also be lowered or raised without unfolding the steps A and B into a platform.

A lever 144 is mounted on pump 143, along with manual control of the valves, to operate the lift device in case of electric power failure. The pump itself is preferably located near the entrance and/or control switches.

While I have described one embodiment of the present invention, many variations may be suggested without departing from the scope of the invention. For instance, an electroelectric motor means could be used to control the operation of the wheelchair stop-flap in place of the mechanism described here.

It will be apparent to those skilled in the art that other variations may be made in the details of construction and application without departing from the spirit and scope of this invention as defined in the pending claims.

I claim:

1. In the doorway of a vehicle, a wheelchair lift which in its slowed position forms the normal entrance steps comprising:
    a multisectional load carrying platform which comprises:
        at least three continguous sections
        means for articulately connecting each section to at least one other section
        means for moving the platform between ground level and vehicle floor level;
        means for rotating at least one section to a substantially vertical position, and for placing at least one other section continguous to said rotatable section into a substantially horizontal position whereby said vertically and horizontally positioned sections form a step structure,
    wherein one of said sections comprises:
        a first flat element forming substantially one half of said section, having its edge nearest to the center of said section and parallel to other sections slidingly interlocking with a second flat element;
        the second flat element forming substantially the second half of said section, having an edge slidingly interlocking with said edge of the first flat element; and
        means for slidingly moving the first flat element in a common plane and in relation to the second flat element, whereby the width of the section is modified.

2. The wheel chair lift claimed in claim 1, wherein the multisectional platform comprises:
    a first section nearest to the threshold of the doorway;
    a second section located between the first and a third section;
    the third section located between the second section and a fourth section;
    the fourth section nearest the outward edge of the platform; and
    means for hingedly connecting the first section to the second section, the second section to the third section and the third section to the fourth section;
    said means for rotating and placing comprise:
        means for withdrawing the third section toward the vehicle and for rotating the second and fourth sections to a substantially vertical position, whereby the first and third sections are placed on two different levels separated by the substantially vertical third section, and the fourth section hangs below the outward edge of the third section;
    the second section comprises:
        a first flat element hingedly connected along its upper edge to the first section, slidingly interlocking with a second flat element;
        the second flat element hingedly connected along its lower edge to the third section, having its upper edge slidingly interlocking with the lower edge of the first flat element; and
        means for resiliently pulling the first and second flat elements towards their minimum common width.

3. The wheelchair lift claimed in 1 wherein said lift platform comprises:
    a first section;
    a second section located between the first section and a third section, hingedly connected to said first and third sections, forming the central part of the platform when in a horizontal position; and
    the third section adjacent to the second section;
    said means for rotating and placing comprise;
        means for withdrawing the third section toward the vehicle and for rotating the second section to a substantially vertical position, whereby the first and third sections are placed on two different levels separated by the substantially vertical second section;
    said second section comprises;
        a first flat element hingedly connected along its upper edge to the first section slidingly interlocking with a second flat element;
        the second flat element hingedly connected along its lower edge to the third section, and having its upper edge slidingly interlocking with the lower edge of the first flat element; and
        means for resiliently pulling the first and second flat elements toward their minimum common width.

4. The wheelchair lift claimed in claim 2 or in claim 3 wherein the lower edge of the first flat element and the upper edge of the second flat element are crenelated in the shape of interlocking patterns.

5. The wheelchair lift claimed in claim 2 or in claim 3 wherein one of said flat elements is telescopically interconnected to the other flat element.

6. The wheelchair lift claimed in claim 1 or in claim 2 wherein said means for supporting the platform comprise:
    vertical lifting guides fastened to the vehicle on each side of the doorway; and
    a carriage having lateral elements slidingly connected to the lifting guides;
    said means for moving the platform comprise:
        hydraulic cylinders associated with the lifting guides acting upon the carriage.

7. The wheelchair lift claimed in claim 2 or claim 3 wherein said means for withdrawing and said means for rotating comprise:
    means for lifting the first section upward in relation to the carriage, and means for pulling the third section backward in relation to the carriage.

8. The wheelchair lift claimed in claim 2, which further comprises:
    means for pushing the fourth section from a substantially vertical position to various angular positions in relation to the third section, whereby the fourth section can act as an access ramp to the platform or as an angle stop preventing a vehicle loaded on the platform from rolling off it.

* * * * *

UNITED STATES PATENT OFFICE
CERTIFICATE OF CORRECTION

PATENT NO. : 4,176,999  
DATED : December 4, 1979  
INVENTOR(S) : Graham R. Thorley Page 1 of 2

It is certified that error appears in the above-identified patent and that said Letters Patent are hereby corrected as shown below:

Column 1, line 55, after "object" insert --is--;

Column 2, line 36, after "position" insert a close parenthesis --)--; delete "and" and insert in its place a comma --,--; delete the comma "," after "A" and insert in its place an open parenthesis --(--; line 37, replace "had" with --has--; delete the comma "," after "outward" and insert in its place a close parenthesis --)--.

Column 3, line 51, delete "telecopic" and insert in its place --telescopic--; line 60, delete "channels" and insert in its place --channel--; line 67, delete "raiser" and insert in its place --riser--.

Column 4, line 34, delete "extending" and insert in its place --extended--; line 68, delete "to" and insert in its place --through--; delete "of" and insert in its place --or--.

Column 5, line 40, delete "energized" and insert in its place --energizes--; line 45, delete "energized" and insert in its place --energizes--; line 51, delete "energized" and insert in its place --energizes--.

Column 6, line 6, delete "close" and insert in its place --closes--.

Column 7, Claim 1, line 2, delete "slowed" and insert in its place --stowed--; line 6, delete "continguous" and insert in its place --contiguous--;

UNITED STATES PATENT AND TRADEMARK OFFICE
CERTIFICATE OF CORRECTION

PATENT NO. : 4,176,999
DATED : December 4, 1979
INVENTOR(S) : Graham R. Thorley

It is certified that error appears in the above—identified patent and that said Letters Patent is hereby corrected as shown below:

Column 7, line 13, "continguous" should read -- contiguous --.

Signed and Sealed this

Twenty-ninth Day of April 1980

[SEAL]

Attest:

SIDNEY A. DIAMOND

Attesting Officer   Commissioner of Patents and Trademarks